United States Patent [19]
Ward

[11] Patent Number: 6,058,230
[45] Date of Patent: May 2, 2000

[54] MODULAR WEATHER-RESISTANT LIGHTING FIXTURE

[75] Inventor: Patrick H. Ward, San Antonio, Tex.

[73] Assignee: Lucifer Lighting Co., San Antonio, Tex.

[21] Appl. No.: 09/084,646

[22] Filed: May 26, 1998

[51] Int. Cl.$^7$ ..................................................... G02B 6/36
[52] U.S. Cl. ............................... 385/33; 385/139; 385/76
[58] Field of Search .................................. 385/33, 34, 35, 385/93, 74, 139, 76, 77

[56] References Cited

U.S. PATENT DOCUMENTS

| | | | |
|---|---|---|---|
| 5,185,836 | 2/1993 | Baker | 385/61 |
| 5,268,977 | 12/1993 | Miller | 385/33 |
| 5,303,125 | 4/1994 | Miller | 362/32 |
| 5,486,984 | 1/1996 | Miller | 362/32 |
| 5,746,494 | 5/1998 | Koeda et al. | 362/32 |

*Primary Examiner*—Hung N. Ngo
*Attorney, Agent, or Firm*—Jenkens & Gilchrist, A Professional Corporation

[57] ABSTRACT

A modular weather-resistant fiber optic lighting fixture comprises a support tube having a support inner bore for receiving a fiber optic light guide, a lens bore, support threads, and a support head with an encircling support ring; a lens disposed within the lens bore; a hood having a hood inner bore in frictional engagement with the support ring; at least one effect element disposed within the hood inner bore; and a compression assembly comprising a compression ring, a compression collet, and a compression fitting, the compression fitting, ring, and collet formed for receiving the fiber optic light guide, and the compression fitting providing threaded engagement with the support threads. The fixture may also comprise several different fittings for recessed mounting in flat surfaces, or mounting to curved surfaces or stakes.

21 Claims, 5 Drawing Sheets

MODULAR WEATHER-RESISTANT LIGHTING FIXTURE

BACKGROUND OF THE INVENTION

1. Technical Field

This invention applies to the field of fiber optics, and more particularly to a functional and protective apparatus that controls the distribution of light emitted from the end of a fiber optic light guide.

2. History of Related Art

Presently known optical light guides fall into the following categories; stranded glass, solio core glass, stranded polymer, solio core polymer and liquid core. Common factors of all presently known optical light guides are their reliance on uniformity of cross section perpendicularly of the points of termination to the central (axis of the light guide and cleanliness of the optical core at the points of termination. Distortion of the emitted light beam and resulting losses in light transmission efficiency and intensity will result if the aforementioned factors are not optimized at the time of installation and maintained throughout the life of the installation.

If area, task, decorative, or accent lighting are needed, it is usually desirable to introduce some form of optical beam control so that the emitted light serves the intended purpose. Examples of such efforts include U.S. Pat. Nos. 5,268,977; 5,303,125; and 5,486,984; all issued to Miller. U.S. Pat. No. 5,286,977 describes a fiber optic zoom-and-dim pin-spot luminaire with a complicated lens structure used to provide illumination with specific characteristics. However, the structure shown does not lend itself to quick disassembly favored by property owners, and further fails to protect the lens from the elements and associative dirt build-up which leads to reduced light transmission.

U.S. Pat. No. 5,303,125 speaks to a fiber optic amiable spotlight having a complex assembly structure which includes a bracketed mirror. This design is also rather difficult to assemble, and does not lend itself to use out of doors.

Finally, U.S. Pat. No. 5,486,984 discloses a parabolic fiber optic luminaire which leaves the ends of the fiber completely open to the elements. This design is also not suitable for use out of doors, and does not provide the desirable characteristics of an optically-guided beam.

The prior art also fails to address providing sufficient support to the fiber prior to its termination at the emitting end, so that the light beam exit point can be accurately predicted and angular excursion of the beam controlled. The failure to address this concern leads to fiber optic fixtures which produce irregular illumination patterns at a distance, distorted according to the deviation of the fiber centerline from the fixture centerline. For example, in a typical prior art fiber optic spotlight, a housing permits entry of a fiber by way of an entry tube. Light, which travels along the fiber centerline, exits the fiber end as fiber exit beams. A lens collimates the fiber exit beams to produce aligned lens exit beams. As long as the fiber centerline is perfectly aligned with the lens centerline, the fiber exit beams will be of equal length as they approach the lens on opposite sides of the lens centerline. Even illumination will then result. However, if the fiber is strained prior to passing through the entry tube, the fiber centerline will be nonparallel to the lens centerline and the illumination resulting from the fixture will be uneven. Further, if the strain is applied on a periodic basis, the illumination will also vary in accord with the amount and timing of the strain.

A prior art fiber optic lighting fixture which provides some relief from these problems has a housing that permits entry of the fiber by way of a four-part assembly, consisting of a support collar, a locking collar nut, a compression bushing, and a compression screw. Depending on the position of the fiber end within the support collar, and the position of support collar within the housing, the illumination provided by the fixture can be widened, narrowed, brightened, or dimmed. However, in some positions such as that required to produce a dimmed-wide beam of light from the fixture, the same off-axis problem described previously is present. That is, strain near the entry point of fiber into the compression screw may produce misalignment between the fiber centerline and the lens centerline. Depending on the direction of misalignment, either low lens exit beams or high lens exit beams will result.

The aforementioned fiber optic fixtures also provide no protection from the elements for the lens and fail to provide for the use of various effect elements (e.g. colored filters, honeycomb or linear louvers, linear lenses, diffusion lenses, etc.), which may be desired by the practical user to color the light, control glare, or vary the beam pattern. Further, the second fixture described requires a four-part assembly to affix the fiber to the housing for use. A less complex manner of attachment is desirable.

For the above and other reasons, it is therefore desirable to provide a fiber optic lighting fixture, suitable for task, area, or decorative lighting, which makes use of inexpensive lenses and various effect elements, is easily assembled and disassembled, is weather resistant so as to provide protection from the elements, and provides substantial support to the fiber inside the fixture so as to maintain alignment of the light beam, and provide even illumination. It is also desirable to provide a fixture which lends itself to inexpensive mass production. Further, it is desirable to have a lighting fixture which is modular, combining the foregoing qualities with choice of mounting devices to adapt the fixture to the required illumination application.

SUMMARY OF THE INVENTION

In accordance with one aspect of the present invention, a modular weather-resistant fiber optic lighting fixture comprises a support tube having a support inner bore for receiving a fiber optic light guide, a lens bore, support threads, and a support head with an encircling support ring; a lens disposed within the lens bore; a hood having a hood inner bore in frictional engagement with the support ring; an effect element disposed within the hood inner bore; and a compression assembly comprising a compression ring, a compression collet, and a compression fitting, the ring, collet, and fitting formed for receiving the fiber optic light guide, and the compression fitting providing threaded engagement with the support threads. The support tube may further comprise a lens ring, the support inner bore and lens bore intersecting to form a lens shelf, wherein the lens is retained within the lens bore by disposition between the lens ring and the lens shelf.

The hood of the present invention may further comprise a hood exit bore which intersects with the hood inner bore to form a hood shelf. The support tube may further comprise a support front wall wherein an effect element may be retained within the hood inner bore by disposition between the hood shelf and the support front wall. The hood may further comprise a hood ring disposed proximate to the hood shelf, and an effect element may be retained within the hood inner bore by disposition between the hood ring and the support front wall. A plurality of effect elements may be disposed within the hood inner bore. The hood of the present invention may be a soffit hood having soffit threads adapted for threaded engagement with an escutcheon or trim ring, or alternatively, the soffit hood may further comprise a recessed channel adapted to receive an escutcheon. The hood exit bore and the support inner bore of the present invention may be reflectively coated.

The support tube may further comprise a support ring groove, the groove retaining the support ring on the support head. The hood may further comprise a hood face, wherein the hood ring defines a vertical axis, and the hood face is parallel to the vertical axis. The hood face may also not be parallel to the vertical axis.

The length of the support inner bore of the present invention may be from about 2 to about 12 times the defined diameter of the fiber optic light guide, desirably from about 4 to about 8 times the diameter of the fiber optic light guide, or preferably, about 5 times the diameter of the fiber optic light guide.

In accord with another aspect of the present invention, the modular weather-resistant fiber optic lighting fixture may comprise a stake mount fitting, a saddle mount fitting, or a surface mount fitting. The stake mount fitting of the present invention may comprise a fitting body pivotally attached to a fitting clamp, and a stake pivotally attached to the fitting body. The fitting clamp may further comprise a stake clamp bore adapted for receiving the support tube.

The saddle mount fitting of the present invention may comprise a saddle pivotally attached to a saddle clamp. The saddle clamp may further comprise a saddle clamp bore may be formed for receiving the support tube.

The surface mount fitting of the present invention may comprise a surface fitting body pivotally attached to a surface fitting clamp, and a mounting plate pivotally attached to the surface fitting body. The surface fitting clamp may further comprise a surface clamp bore formed for receiving the support tube.

BRIEF DESCRIPTION OF THE DRAWINGS

A more complete understanding of the structure and operation of the present invention may be had by reference to the following detailed description when taken in conjunction with the accompanying drawings, wherein.

DETAILED DESCRIPTION OF PRESENTLY PREFERRED EMBODIMENT

Figure 1:
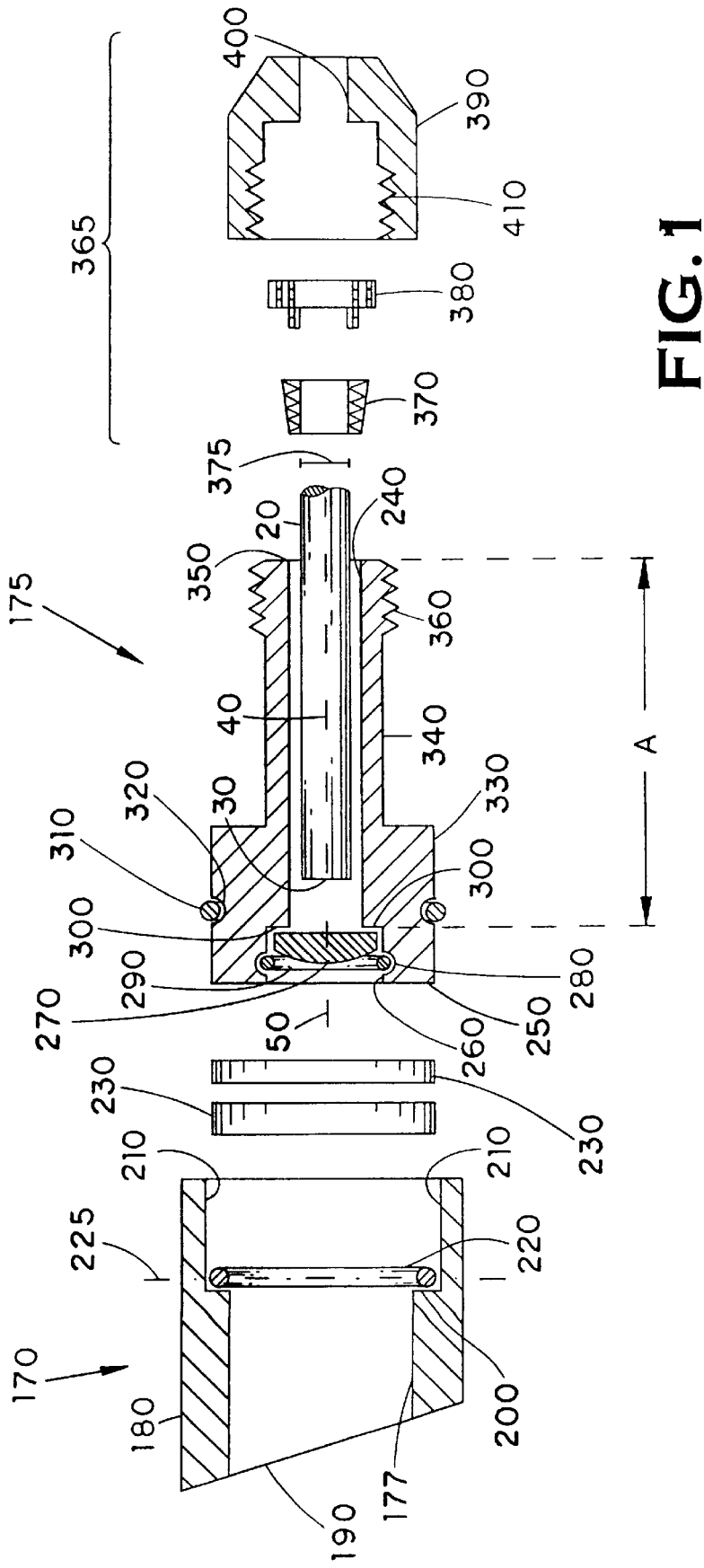
FIG. 1 is a side cross-sectional, exploded, view of a modular weather-resistant fiber optic lighting fixture according to the present invention.

Turning now to FIG. 1, a side cross-sectional, exploded, view of the modular weather-resistant lighting fixture of the present invention can be seen. In this illustration (FIG. 1), the fixture is shown disassembled. The basic fixture comprises a hood 170, effect elements 230, a support tube 175, and a three-part compression assembly 365 for affixing the fiber 20 to the support tube 175.

The hood 170 further comprises a hood exit bore 177 and a hood inner bore 210, which intersect at some point along the length of the hood body 180 to produce a hood shelf 200. The hood ring 220, which will normally be made from rubber or some type of resilient material such as a polymer, rests against the hood shelf 200. The hood exit bore 177 may be coated with a reflective material or not, according to the desire of the user. The hood face 190 may be angled away from the vertical axis 225 (defined by the plane of the hood ring 220), or may be made parallel to the vertical axis 225, according to the desire of the user and the particular application.

The support tube 175 further comprises a support head 330 and a support neck 340. In a fashion similar to that executed in the hood 170, lens bore 260 runs along the interior of the support head 330 to intersect the support inner bore 240 at some point along the length of support head 330; this intersection point is generally referred to as the lens shelf 300. A simple lens 270 is placed within lens bore 260 so as to rest against the lens shelf 300. The simple lens 270 is held in place against the lens shelf 300 by way of a lens ring 290, which is typically made of rubber, or other resilient material, such as a polymer. The lens ring groove 280, which serves to seat the lens ring 290, ensures that the simple lens 270 does not fall out of the lens bore 260.

To affix the fiber 20 within the support inner bore 240, the compression assembly 365, which comprises a compression ring 370, a compression collet 380, and a compression fitting 390 is used.

Figure 2:
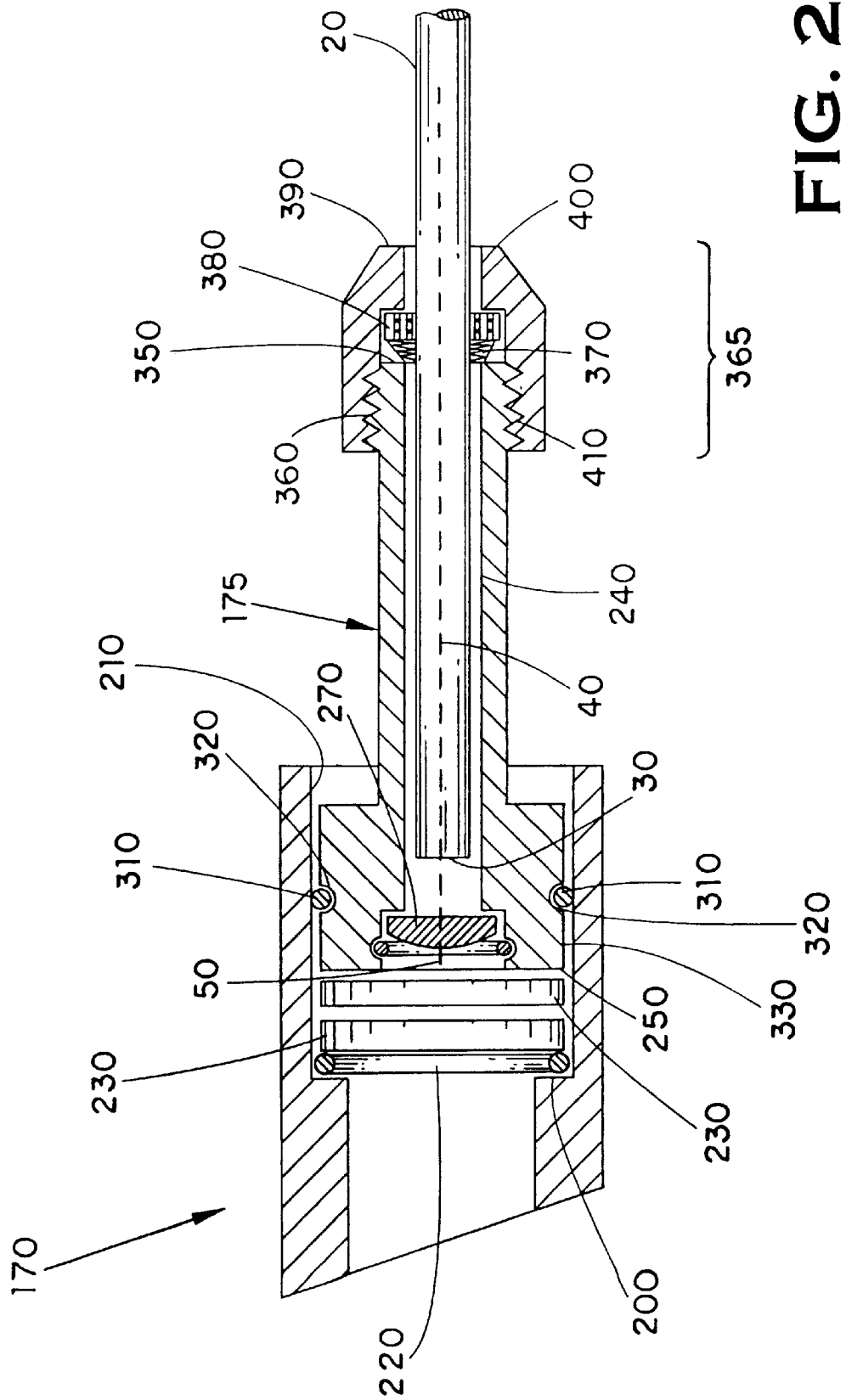
FIG. 2 is a side cross-sectional view of a modular weather-resistant fiber optic lighting fixture according to the present invention.

Turning now to FIG. 2, a side cross-sectional view of the assembled fixture according to the present invention can be seen. The steps required to assemble the fixture generally include affixing the fiber 20 to the support tube 175, and then affixing the resulting support tube assembly to the hood 170. To affix the fiber 20 to the support tube 175, the compression fitting 390, the compression collet 380, and the compression ring 370 are placed over the fiber end 30. Next, the fiber end 30 is placed at the desired position along the length of the support inner bore 240, and the support threads 360 are engaged with the fitting threads 410 until the support rear wall 350 is firmly encountered by the compression ring 370. Threading engagement between the fitting threads 410 and the support threads 360 may be continued until the proper degree of friction exists between the outer jacket of the fiber 20 and the compression ring 370. Typically, the simple lens 270 will be similar to, or identical to, a plano-convex lens. However, other simple lenses, such as plano-concave, double-convex, double-concave and plano-aspheric, may also be used. During use, the fiber end 30 will be positioned in close proximity to the simple lens 270 such that several centimeters of the fiber 20, which is typically defined as having about a 3.1 mm or 12.6 mm diameter, will be enclosed within the support inner bore 240. This arrangement ensures that the fiber centerline 40 is parallel with the lens centerline 50.

Once the fiber 20 has been affixed to the support tube 175, the hood 170 is typically affixed to the support tube 175. This occurs by way of frictional engagement between the support ring 310 and the hood inner bore 210. The support ring 310 is retained on the support head 330 by way of a support ring groove 320. The hood ring 220, resting against the hood shelf 200, provides a cushioned and sealed surface for receipt of a single effect element 230, or a plurality thereof, which are held in place against the hood ring 220 by the support front wall 250. However, if the effect element 230 proximate to the hood shelf 200 is formulated from a resilient material, or the hood 170 is made from such a material (e.g. rubber or compliant polymer), the need for a hood ring 220 may be obviated, since the compliance of the effect element 230 (or hood 170) provides an appropriate seal against dust and the elements.

The assembled fixture may be quickly disassembled by simply pulling off the hood 170 away from the support tube 175 with a slight twisting motion. The frictional engagement between support ring 310 and hood inner bore 210 is meant to be water and dust-tight, yet loose enough for manual (i.e. no tools needed) assembly/disassembly. In a similar fashion, assembly 365 also provides a water and dust-tight seal against the elements for the support tube 175.

The assembled fixture illustrated in FIG. 2 thus provides a modular weather-resistant approach to fiber optic fixture lighting. The length of the support inner bore 240, shown as distance "A" in FIG. 1, is generally between two and twelve times the defined diameter of the fiber 375. However, the best compromise between function (i.e., alignment of the fiber centerline 40 with the lens centerline 50) and excessive length of the support neck 340 has been found to occur when the length of the support inner bore 240 is approximately 4–8 times the diameter of the fiber 375, and is most preferably accomplished when the length of the support inner bore 240 is five times the diameter of the fiber 375. Thus, any strain applied to the fiber 20 as it enters the support tube 175 by way of fitting entry 400 will not result in the misalignment of the fiber centerline 40 and the lens centerline 50.

The fixture of the present invention also provides an inexpensive and easily manufactured solution to the problem of providing a modular, weather-resistant fiber optic lighting fixture. Many of the parts are easily manufactured, with a minimum of machining steps. Further, the ability to insert one, or a plurality of, effect elements 230 between the simple lens 270 and the hood ring 220 provides for a dramatic range of lighting effects from a simple fixture. For example, the effect elements may include clear protective elements, frosted elements, diffusion elements, linear lens elements, linear spread lenses, blade louvers, honeycomb louvers, and color filters. In any case, at least one effect element will be used in the preferred embodiment of the present invention. This effect element 230 not only provides for a variety of lighting effects (and glare control), but also serves the purpose of maintaining a water and dust-tight seal against the elements for the simple lens 270. While color filters may be imposed at the illuminator end of the fiber, use of such filters at the fiber end (as accomplished with the present invention) produces a higher light intensity from the fixture. In addition, there is a possibility of producing multiple colors from a single illuminator using the fixture of the present invention.

The fixture of the present invention may be used in grade, above grade, and under water. Because the fixture is fed by fiber optic cable, which can be either glass or plastic fiber, it is never necessary to replace the source of illumination at the fixture itself. Further, the water and dust-tight properties of the fixture obviate the need to clean internal effect elements and lenses on a constant basis.

Figure 3:
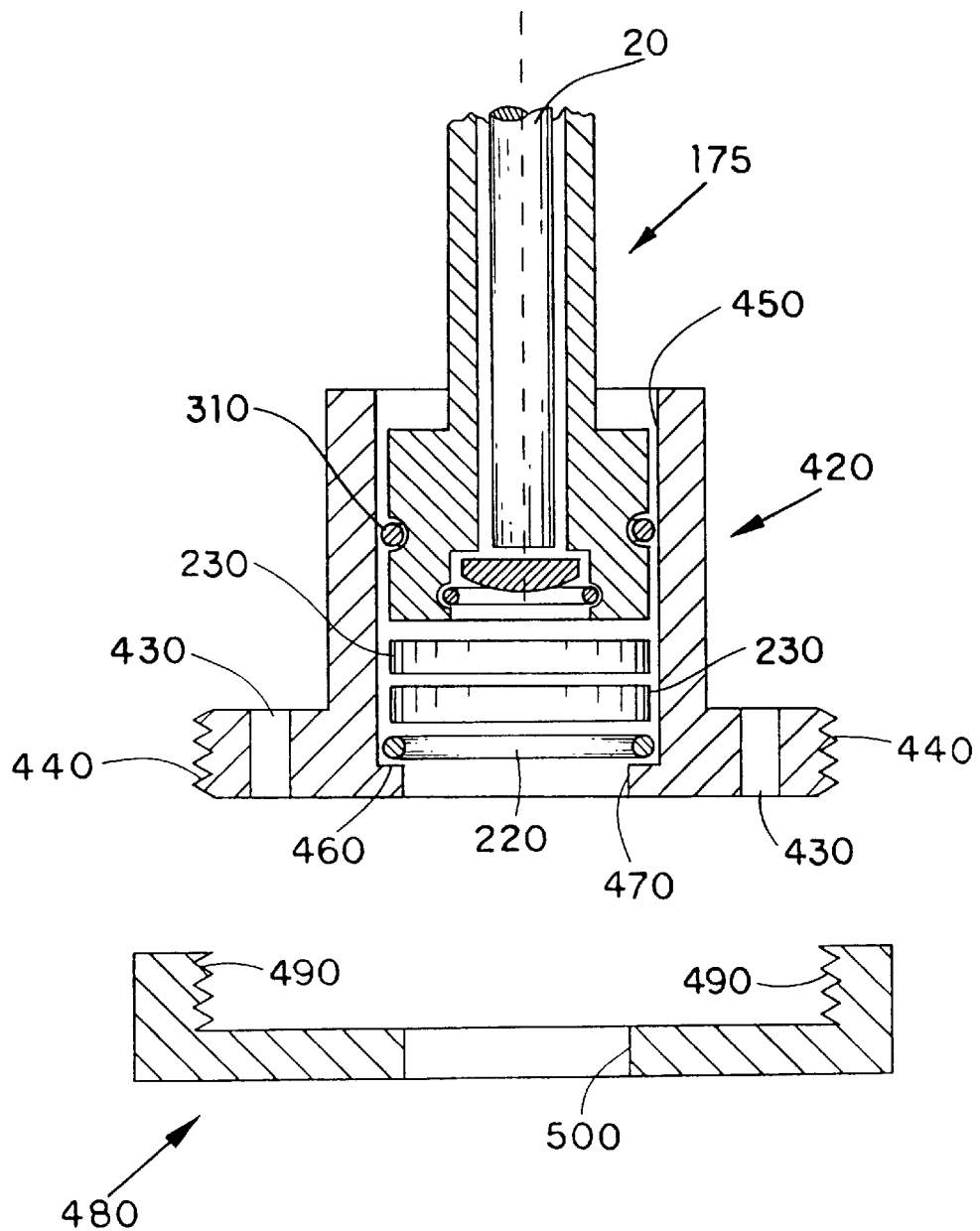
FIG. 3 is a side cross-sectional view of an alternative embodiment of a modular weather-resistant fiber optic lighting fixture according to the present invention.
Figure 4:
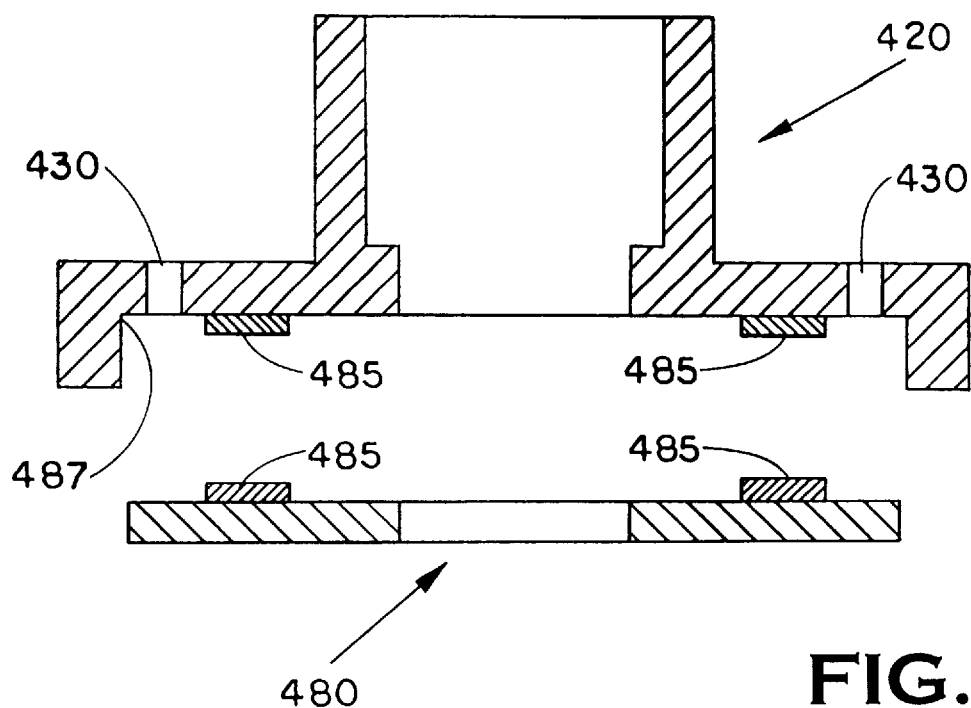
FIG. 4 is a side cross-sectional view of an alternative method of mounting the soffit hood of the present invention.

The hood 170, a shown in FIGS. 1 and 2, may take other forms, depending on the particular mounting scheme employed by the user. For example, as shown in FIGS. 3 and 4, the hood 170 may take the form of soffit hood 420. In this case, the user may desire to mount the fixture of the present invention directly to a soffit by way of soffit mounting holes 430. However, the manner of frictional engagement between support ring 310 and soffit inner bore 450, is similar to, or identical to, the manner of frictional engagement between the support ring 310 and the hood inner bore 210. Effect elements 230, which may comprise a single element, or a plurality of elements, are maintained in position by the physical pressure of support tube 175 against the elements 230, which are held in place against a hood ring 220, which rests against the soffit shelf 460. As a decorative addition, and a way of hiding mounting screws or nails used in the soffit mounting holes 430, an escutcheon 480 may be applied to the soffit hood 420 by way of threaded engagement between the soffit threads 440 and the escutcheon threads 490. An alternative method of decoration would be to employ a soffit hod 420 with a recess 487 to accept a trim ring or escutcheon 480 retained in place by hook and loop type fasteners or adhesive 485 in lieu of threaded engagement. After the Escutcheon 480 is engaged with the soffit hood 420, the light exiting from the fiber 20 will pass through the soffit exit bore 470 and the escutcheon exit bore 500.

Figure 5:
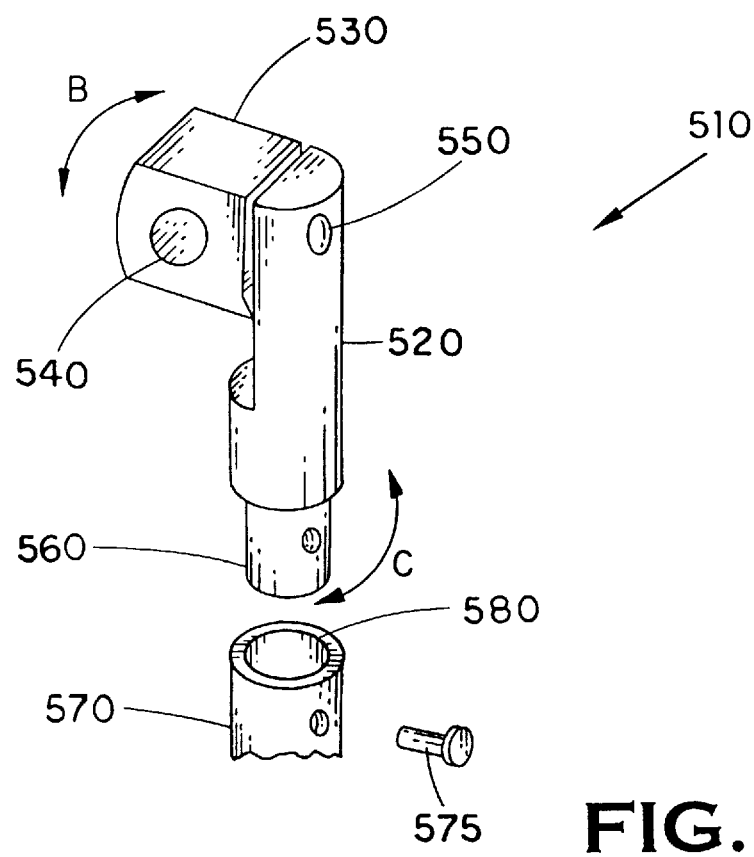
FIG. 5 illustrates a stake mounting fixture according to the present invention.
Figure 6:
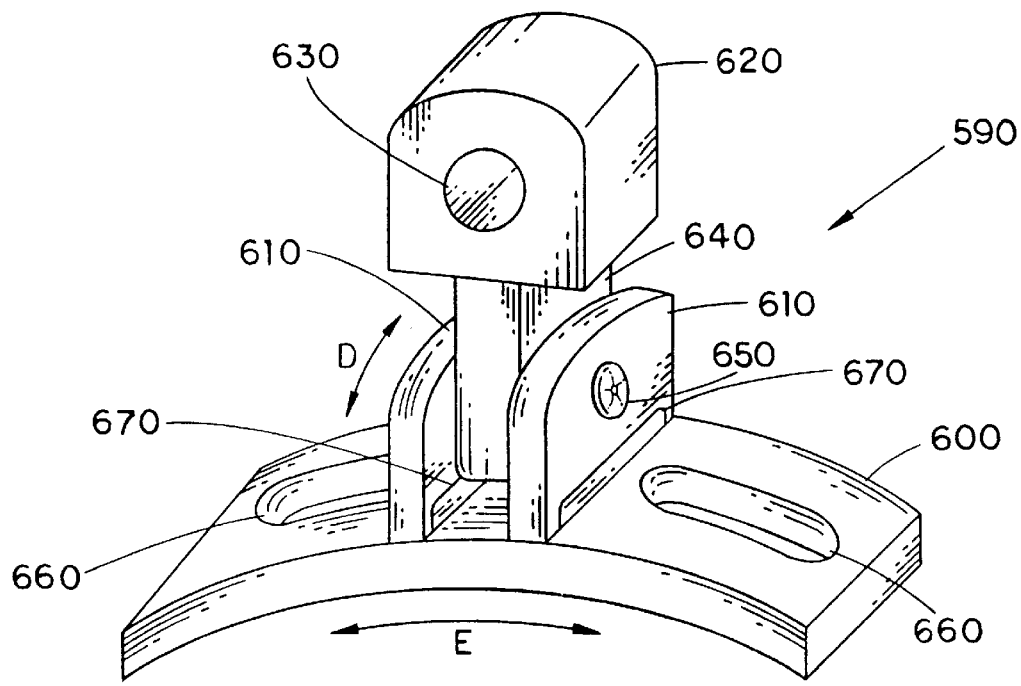
FIG. 6 illustrates a saddle mounting fixture according to the present invention.
Figure 7:
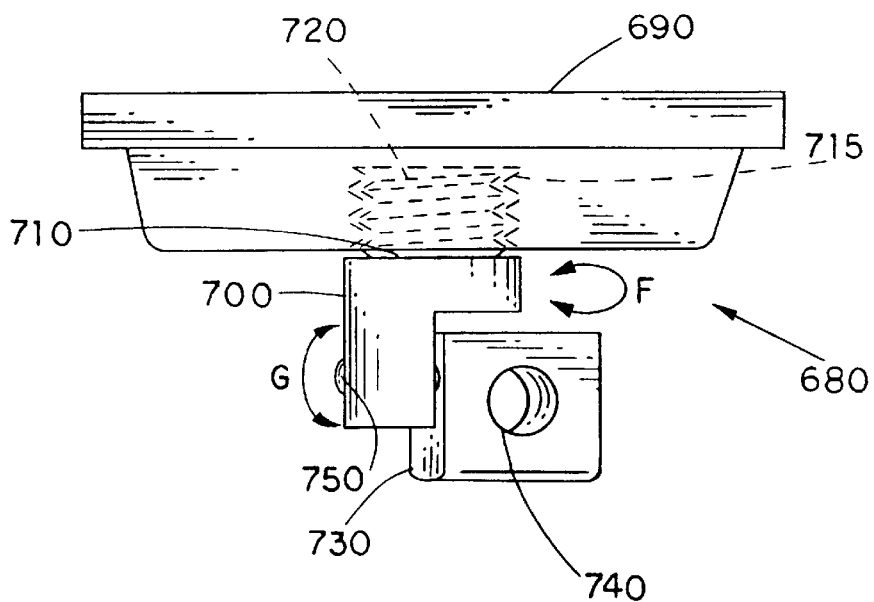
FIG. 7 illustrates a surface mounting fixture according to the present invention.

FIGS. 5, 6 and 7 illustrate several mounting systems for the fixture of the present invention. Of course, these systems are not typically used in combination with the soffit hood illustrated in FIG. 3, but are more typically used with the assembled fixture illustrated in FIG. 2.

FIG. 5 illustrates a stake mount fitting 510 in perspective view. The stake mount fitting 510 typically comprises a fitting body 520 rotatably attached to a fitting clamp 530. The stake clamp pivot 550 permits the fitting clamp 530 to rotate as shown by arrow "B". Further, by providing the fitting body 520 with a fitting pivot 560, rotation of the fitting body 520 may be accomplished according to arrow "C", after fitting pivot 560 is inserted within the stake entry 580 for rotation in the direction of arrow "C" with respect to the fixed stake 570. The stake mount fitting 510 is typically used for outdoor lighting purposes. The stake clamp bore 540 is sized so as to provide a frictional fit between the inner diameter of the stake clamp bore 540 and the outer diameter of the fixture support neck 340. Of course, many other methods of interface between the fitting clamp 530 and the support neck 340 are possible, including, lock-screws, adhesive, and O-ring frictional engagement (e.g., similar to that used for the frictional engagement between the support ring 310 and the hood inner bore 210). By rotating the fitting clamp 530 about the stake clamp pivot 550 and the fitting pivot 560, almost any orientation of the fixture may be achieved with respect to a fixed stake 570 position, and that orientation maintained by set screw 575.

FIG. 6 illustrates a saddle mount fitting 590, which is typically used to attach the fixture shown in FIG. 2 to a tree, pole, or other curved surface. In this case, the saddle 600 is provided with ears 610 which support a saddle clamp 620 having a clamp neck 640. The saddle clamp 620 is able to pivot about the saddle clamp pivot 650 so as to follow the direction of arrow "D". Lateral adjustment may be attained by rotating the entire saddle fitting assembly about the object to which it will be attached as indicated by arrow "E". The saddle clamp pivot 650 may comprise a friction fitting, such as a rivet, or a screw/nut combination. The saddle mount fitting 590 is typically mounted to a tree using either the saddle mounting holes 660, in combination with screws or nails, or in the alternative, the saddle mounting slot 670, in combination with a strap that encircles the object to which the saddle mount fitting 590 is attached. The strap (not shown) fits through each of the saddle mounting slots 670. The fixture is meant to be accommodated by way of the saddle clamp bore 630, in a similar manner, or an identical manner, to that described for the stake mount fitting 510 with respect to the fitting clamp 530.

FIG. 7 illustrates a surface mount fitting 680, which is typically used to mount the fixture illustrated in FIG. 5 to a flat surface. The surface mount fitting 680 typically comprises a mounting plate 690, to which a surface fitting body 700 is engaged by means of threads 715 on a surface fitting pivot 720. In this way, the surface fitting pivot may rotate in the direction of arrow "F" as it is pivotally engaged to the mounting plate 690 at the plate interface 710. Also, in a manner similar to, or identical to, the pivoting engagement of the fitting clamp and fitting body of FIG. 5, the surface fitting clamp 730 and the surface fitting body 700 are also pivotally engaged. In this case, by way of surface clamp pivot 750, which allows rotation in the direction shown by arrow "G". Also, as described previously for the fitting illustrated in FIG. 5, the surface clamp bore 740 is meant to accommodate the support tube 175 of the fixture shown in FIG. 2 so that, by rotating the surface mount fitting 680 according to the limitations provided by the surface clamp pivot 750 and the surface fitting pivot 720, the fixture may be positioned in almost any orientation desired with respect to the mounting plate 690.

Although the present invention is described in terms of a preferred exemplary embodiment with specific reference to use with various fittings, it is also applicable to other areas of art wherein incandescent or other types of illumination elements may be applied. More specifically, non-fiber optic lighting may be used with the fixture of the present invention. However, such use deprives the invention of one of its advantages, which includes the result of obviating illumination element replacement at the location of the fixture. Other aspects, features and advantages of the present invention may be obtained from the study of this disclosure and the drawings, along with the appended claims.

What I claim is:

1. A modular, weather-resistant fiber optic lighting fixture, comprising:

a support tube having a support inner bore for receiving a fiber optic light guide, a lens bore, support engagement means, and a support head with an encircling support ring;

a simple lens disposed within said lens bore;

a hood having a hood inner bore in frictional engagement with the support ring; and a compression assembly comprising a compression ring, a compression collet, and a compression fitting, said compression fitting, compression ring, and collet formed for receiving said fiber optic light guide, and said compression fitting providing engagement with the support engagement means.

2. The modular, weather-resistant fiber optic lighting fixture of claim 1, wherein the support tube further comprises a lens ring, the support inner bore and the lens bore intersect to form a lens shelf, and the lens is retained within the lens bore by disposition between the lens ring and the lens shelf.

3. The modular, weather-resistant fiber optic lighting fixture of claim 1, wherein the hood comprises a hood exit bore, the hood inner bore and the hood exit bore intersecting to form a hood shelf, the support tube further comprises a support front wall, and an effect element is retained within the hood inner bore by disposition between the hood shelf and the support front wall.

4. The modular, weather-resistant fiber optic lighting fixture of claim 1, wherein the hood comprises a hood exit bore, the hood inner bore and the hood exit bore intersect to form a hood shelf, and the hood includes a hood ring disposed proximate to the hood shelf, the support tube further comprises a support front wall, and an effect element is retained within the hood inner bore by disposition between the hood ring and the support front wall.

5. The modular, weather-resistant fiber optic lighting fixture of claim 4, wherein the hood exit bore is reflectively coated.

6. The modular, weather-resistant fiber optic lighting fixture of claim 4, wherein the support inner bore is reflectively coated.

7. The modular, weather-resistant fiber optic lighting fixture of claim 1, wherein a plurality of effect elements are disposed within the hood inner bore.

8. The modular, weather-resistant fiber optic lighting fixture of claim 1, wherein the support tube comprises a support ring groove, said groove retaining the support ring on the support head.

9. The modular, weather-resistant fiber optic lighting fixture of claim 1, wherein the hood comprises a hood face, the hood ring defining a vertical axis, and the hood face is parallel to the vertical axis.

10. The modular, weather-resistant fiber optic lighting fixture of claim 1, wherein the hood comprises a hood face, the hood ring defining a vertical axis, and the hood face is not parallel to the vertical axis.

11. The modular, weather-resistant fiber optic lighting fixture of claim 1, wherein said fiber optic light guide has a defined diameter and the length of the support inner bore is from about 2 to about 12 times the diameter of the fiber optic light guide.

12. The modular, weather-resistant fiber optic lighting fixture of claim 1, wherein said fiber optic light guide has a defined diameter and the length of the support inner bore is from about 4 to about 8 times the diameter of the fiber optic light guide.

13. The modular, weather-resistant fiber optic lighting fixture of claim 1, wherein said fiber optic light guide has a defined diameter and the length of the support inner bore is about 5 times the diameter of the fiber optic light guide.

14. The modular, weather-resistant fiber optic lighting fixture of claim 1, wherein the hood is a soffit hood, said soffit hood having threads adapted for engagement with an escutcheon.

15. The modular, weather-resistant fiber optic lighting fixture of claim 1, wherein the hood is a soffit hood, said soffit hood having a recessed channel adapted for receiving an escutcheon.

16. The modular, weather-resistant fiber optic lighting fixture of claim 1, comprising:

a stake mount fitting having a fitting body pivotally attached to a fitting clamp and a stake pivotally attached to the fitting body.

17. The modular, weather-resistant fiber optic lighting fixture of claim 16, wherein the fitting clamp further comprises a stake clamp bore adapted for receiving the support tube.

18. The modular, weather-resistant fiber optic lighting fixture of claim 1, comprising a saddle mount fitting having a saddle pivotally attached to a saddle clamp.

19. The modular, weather-resistant fiber optic lighting fixture of claim 18, wherein the saddle clamp further comprises a saddle clamp bore adapted for receiving the support tube.

20. The modular, weather-resistant fiber optic lighting fixture of claim 1, wherein said fixture includes a surface mount fitting comprising a surface fitting body pivotally attached to a surface fitting clamp and a mounting plate pivotally attached to the surface fitting body.

21. The modular, weather-resistant fiber optic lighting fixture of claim 20, wherein the surface fitting clamp comprises a surface clamp bore adapted for receiving the support tube.

* * * * *